United States Patent [19]
Henderson

[11] Patent Number: 6,145,447
[45] Date of Patent: Nov. 14, 2000

[54] FOLDABLE TABLE FOR VEHICLES

[76] Inventor: Robert Henderson, 16863 Ashton, Detroit, Mich. 48219

[21] Appl. No.: 09/317,245

[22] Filed: May 24, 1999

[51] Int. Cl.$^7$ .................................................. A47B 23/00
[52] U.S. Cl. ............................... 108/44; 108/115; 108/99
[58] Field of Search ............................ 108/44, 145, 143, 108/42, 99, 115

[56] References Cited

U.S. PATENT DOCUMENTS

| | | | |
|---|---|---|---|
| 2,471,730 | 5/1949 | Doerr | 108/44 X |
| 3,338,620 | 8/1967 | Cauvin | 108/44 X |
| 4,962,709 | 10/1990 | Huber | 108/44 |
| 5,427,033 | 6/1995 | Bly | 108/44 |
| 5,479,866 | 1/1996 | Rae | 108/44 |
| 5,681,116 | 10/1997 | Lin | 108/143 X |
| 5,771,815 | 6/1998 | Leftwich | 108/44 X |

Primary Examiner—Jose V. Chen

[57] ABSTRACT

A foldable table comprises a flat table top supported upon a collapsible frame which is removably fitted within the trunk of an automobile or similar space in an automotive vehicle. The frame includes lower frame members which are rested upon the floor of the vehicle and upper frame members which support the table top. The upper and lower frame members are connected together by pivotal table leg members which enable the upper frame members, with the supported table top, to be raised or lowered relative to the lower frame members. The table top is slidably connected to the upper frame members for sliding part-way out of the vehicle. The table top, which normally is in a horizontal, lower, storage position within the vehicle can be manually raised while still horizontal and then slid part-way out of the vehicle for table use. Thus, articles may be supported upon the table in both its raised table use position and in its lowered storage position.

11 Claims, 3 Drawing Sheets

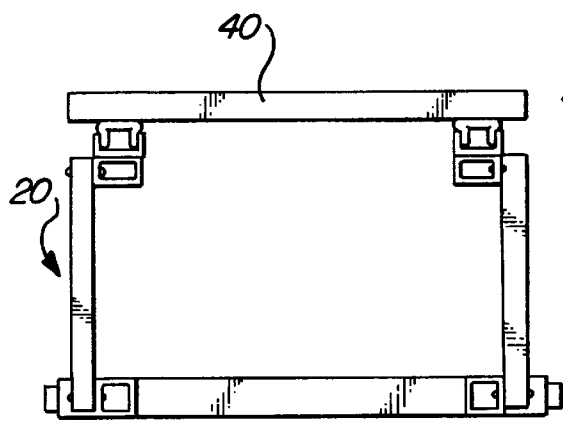
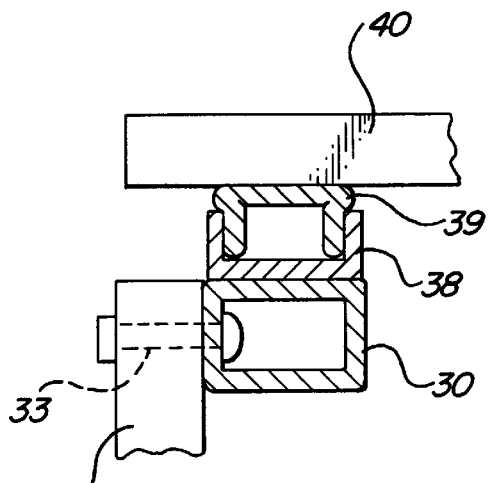
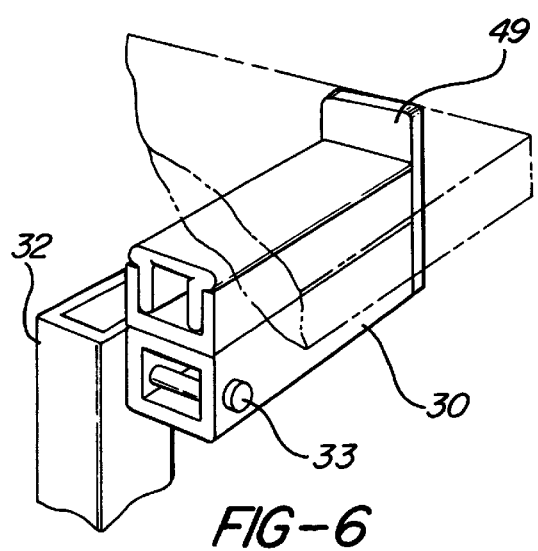
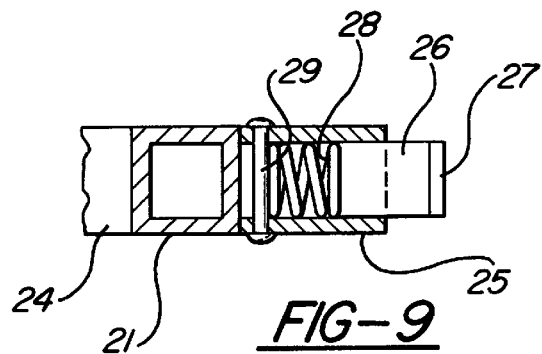
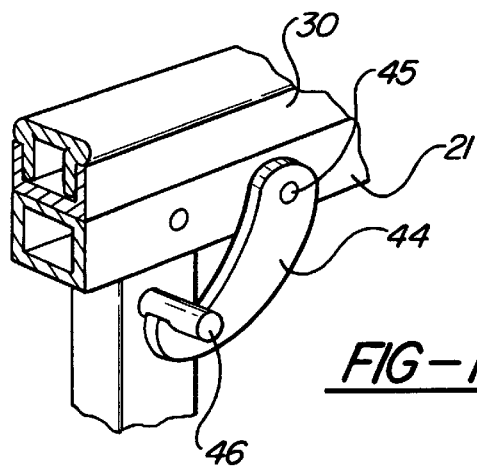

FOLDABLE TABLE FOR VEHICLES

This invention relates to a collapsible or foldable table which may be folded and removeably fitted within the trunk of an automobile for storage and may be unfolded and projected rearwardly of the vehicle for uses such as for tailgate picnics or the like.

BACKGROUND OF INVENTION

At infrequent times, the occupants of an automobile may desire to have a table which to use for picnics or for so-called "tailgate" parties or for displaying or otherwise supporting objects carried within the vehicle. Since the amount of storage space within a vehicle for holding a table is limited, various types of folding tables have been proposed in the past. Some of these tables could be collapsed into a smaller volume by using foldable legs. Such tables could be fitted within the vehicle trunk or within the cabin of a van or a station wagon or utility vehicle. When desired, the tables could be removed from the vehicle and then, by unfolding the legs, the table could be placed into a use position. When not needed, the table legs could be folded and the table lifted into, and replaced within, the vehicle.

Another type of table proposed in the past for use with vehicles has been a type that could have an edge attached to the vehicle and an opposite edge supported upon only two legs arranged outside of the vehicle. This type of table also required lifting the table from its collapsed, storage position within the trunk or body of the vehicle, removing the table outwardly, over the rear portion of the vehicle body, and finally, setting it up for table use.

Prior foldable types of tables, in general required manipulating the tables for lifting the tables out of, or into, the vehicle, then extending the legs and finally positioning the tables either entirely upon the ground or partially upon the ground and partially upon the vehicle. However, the lifting and positioning movements of those tables interfere with placing articles upon such tables when the tables are stored and leaving the articles on the tables while the tables are moved into use position.

It would be desirable to provide a foldable table, which can be collapsed into a flat, storage condition so as to occupy a minimal amount of space within an automobile trunk or within the rear of a station wagon or sport utility vehicle or van or the like, but which can be manually manipulated into a use position, including extending at least partially outwardly of the vehicle, while supporting articles at all times during the storage and use positions and movements there between.

This invention is concerned with providing such a, foldable table which maintains a horizontal position at all times during storage, use and movements to and from such positions.

SUMMARY OF INVENTION

The invention herein it is concerned with providing a foldable or collapsible table which can be removably stored within the trunk, or the body, of an automotive vehicle. The table top is stored flat, adjacent the floor of the vehicle to provide a platform upon which articles can be supported. Then, the table top can be manipulated upwardly and outwardly of the vehicle to partially extend rearwardly of the vehicle. During the manipulation, the table top remains horizontal and is able to continue supporting articles that are stored thereon, without the articles being disturbed sufficiently to overturn them or spill them. Similarly, the table can be manipulated from its table use position back into its storage position within the vehicle while leaving any articles upon the table top at all times during the manipulation required for collapsing the table.

This invention contemplates providing a collapsible support frame for a flat table top. The frame may be manually, removably installed within the trunk of an automobile or within the rear of the body of station wagon or sport utility vehicle or van or truck. The frame comprises a lower frame portion that rests upon the floor of the vehicle and is held inmovably in position. The frame has an upper frame portion upon which the table top is slideably supported. The upper frame parts and table top may be manipulated downward by manually moving the table top close to the lower frame and the floor of the vehicle. Alternatively, the table top and the supporting upper frame portions may be manipulated upwardly, while the table top remains horizontal, into a position that is spaced a considerable distance above the vehicle floor. Then, the table top may be manually pulled rearwardly of the vehicle to slide part-way out of the vehicle so that it may be exposed for use. Thus, the table top is cantilevered outwardly of the vehicle.

The upper and lower frame portions are interconnected by legs which pivot so as to provide for the downwardly and upwardly movement of the upper frame portion, with the table top, relative to the lower frame portion. Thus, the table may be quickly and easily installed within a vehicle and manipulated, while supporting articles upon the top of the table, from a collapsed storage to a raised table use position and back to a storage position when no longer in use.

An object of this invention is to provide a simple, inexpensively constructed, foldable or collapsible table designed to removeably fit within the trunk of an automobile or a similar space within a station wagon, sport utility vehicle, or van or truck. The construction enables the user of the vehicle to quickly and easily install the collapsible table within the vehicle without tools and, when desired, to raise the table which is otherwise flattened near the floor of the vehicle, into a raised and outwardly projecting position for table use while maintaining the horizontal position of the table top for holding articles during table storage and table use positions.

A further object of this invention is to provide a simplified table construction wherein the table top may be maneuvered into or out of the vehicle and is supported by a framework within the vehicle, providing without the necessity of supporting legs externally of the vehicle for holding the table in use position.

Yet another object of this invention is to provide an inexpensive, sturdy, collapsible framework for supporting a table top in a collapsed, storage position, within an automotive vehicle and in a raised use position in which the table top extends, at least part-way out of the vehicle, without external supporting legs.

These and other objects and advantages of this invention will become apparent upon reading the following description, of which the attached drawings form a part.

DESCRIPTION OF DRAWINGS

FIG. 4 is an enlarged, end view of the raised table, that is, in the position shown in FIG. 2.

FIG. 5 is an enlarged, fragmentary, cross-sectional view showing the connection between the table top and the upper frame members of the framework that supports the table top.

FIG. 6 is a perspective, enlarged, fragmentary view of the connection between the upper frame members and the table top, taken as if in the direction of arrows 6—6 on FIG. 2.

FIG. 9 is an enlarged, cross-sectional view taken in the direction of arrow 9—9 of FIG. 7 and showing the fastener for temporarily holding the framework within the vehicle body.

FIG. 10 is an enlarged, perspective view showing a form of fastener for holding the framework in its raised position.

DETAILED DESCRIPTION

Figure 1:
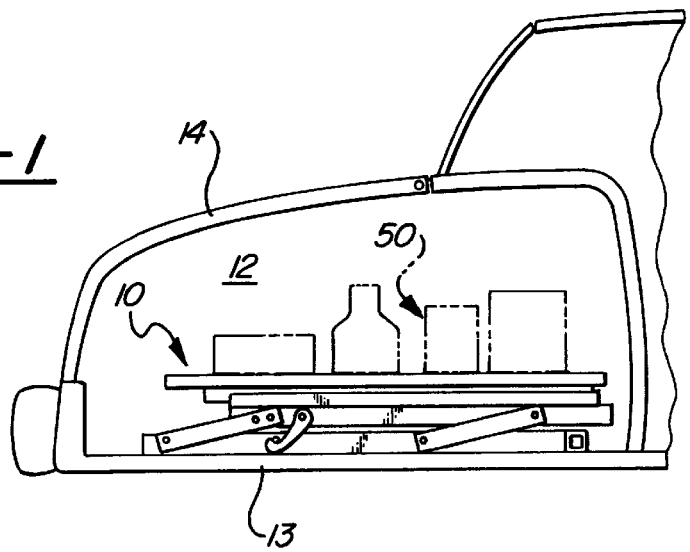
FIG. 1 schematically illustrates the rear, trunk area of a typical automobile, with the foldable or collapsible table arranged within the trunk and with the table top collapsed downwardly adjacent the floor of the vehicle.
Figure 2:
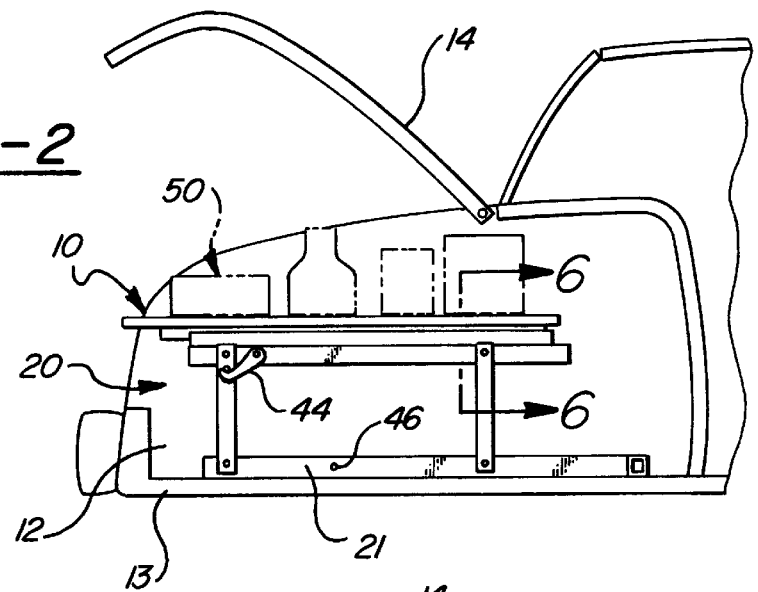
FIG. 2 schematically, illustrates, the trunk lid in its open position, and the table top raised in its upward position at a distance above the floor of the vehicle.
Figure 3:
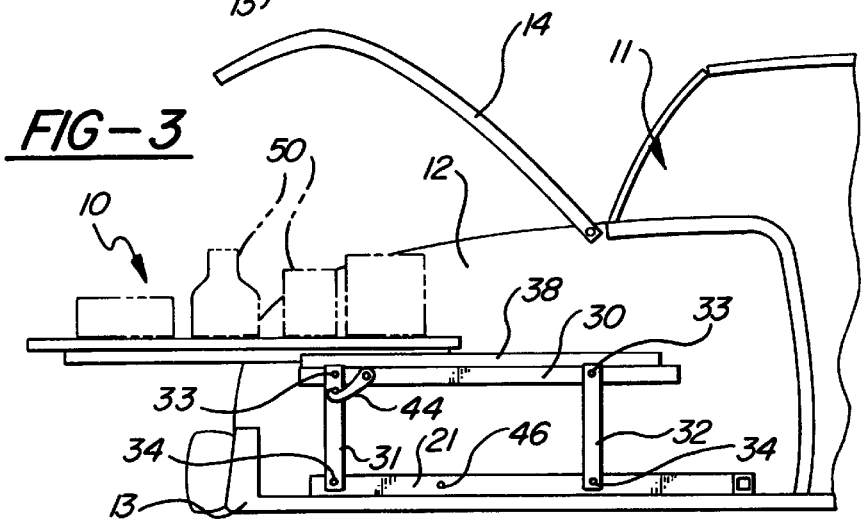
FIG. 3 schematically illustrates the trunk lid open and the table top slid rearwardly and part-way out of the vehicle for table use.

FIGS. 1–3, schematically illustrate a foldable table 10 fitted within an automobile 11 which is also schematically illustrated. The table is removably, arranged, within the automobile trunk 12 and rests upon the floor 13 of the trunk area. The trunk lid 14, which may vary in shape and size is schematically shown in its closed position in FIG. 1 and in open positions in FIGS. 2 and 3.

The table frame or framework 20, includes a pair of longitudinally extended, elongated frame members 21. These may be in form of hollow tubes made of a suitable metal which is strong enough and durable enough for this purpose. The selection of the particular type of metal and the cross-sectional shape and sizes of the tubes can be made by those skilled in the art.

The lower frame members are connected by cross-members to form a rigid lower frame portion. The cross-members include a rear (relative to the vehicle's rear) cross-member 22 a center cross-member 23 and forward cross-member 24. Each of cross-member has its ends rigidly fastened, as by welding, to the lower frame members 21.

In addition, fasteners may be provided to rigidly hold the lower frame immovably in position, within the vehicle trunk (see FIG. 9). The particular frame fasteners may vary. Any conventional, commercially available fasteners which can temporarily secure the framework within position within the vehicle can be used. For example, one form may comprise sliders or pistons 26 telescopically fitted within tubular sockets 25. The sliders have end pads 27 which engage against the walls of the vehicle trunk. The sliders 26 are biased by springs 28 into forcefully pushing outwardly against the walls of the vehicle. An internal pin 29 (see FIG. 9) backs the springs 28.

The framework includes upper frame members 30 which, preferably, extend longitudinally of the vehicle, parallel to, but laterally offset from the lower frame members 21. The upper frame members 30 and lower frame members 21 are interconnected by a rearward (relative to the vehicle) pair of pivot legs 31 and a forward pair of pivot legs 32. These pivot legs are connected by upper pivot pins 33 to the upper frame members 30 and by lower pivot pins 34 to the lower frame members 21. Thus, the upper frame members may be moved downwardly towards and against the lower frame members by pivoting the legs. The legs, when arranged upright, as shown in FIG. 3, support the upper frame members at a considerable distance above the lower frame members for table use position purposes.

Figure 7:
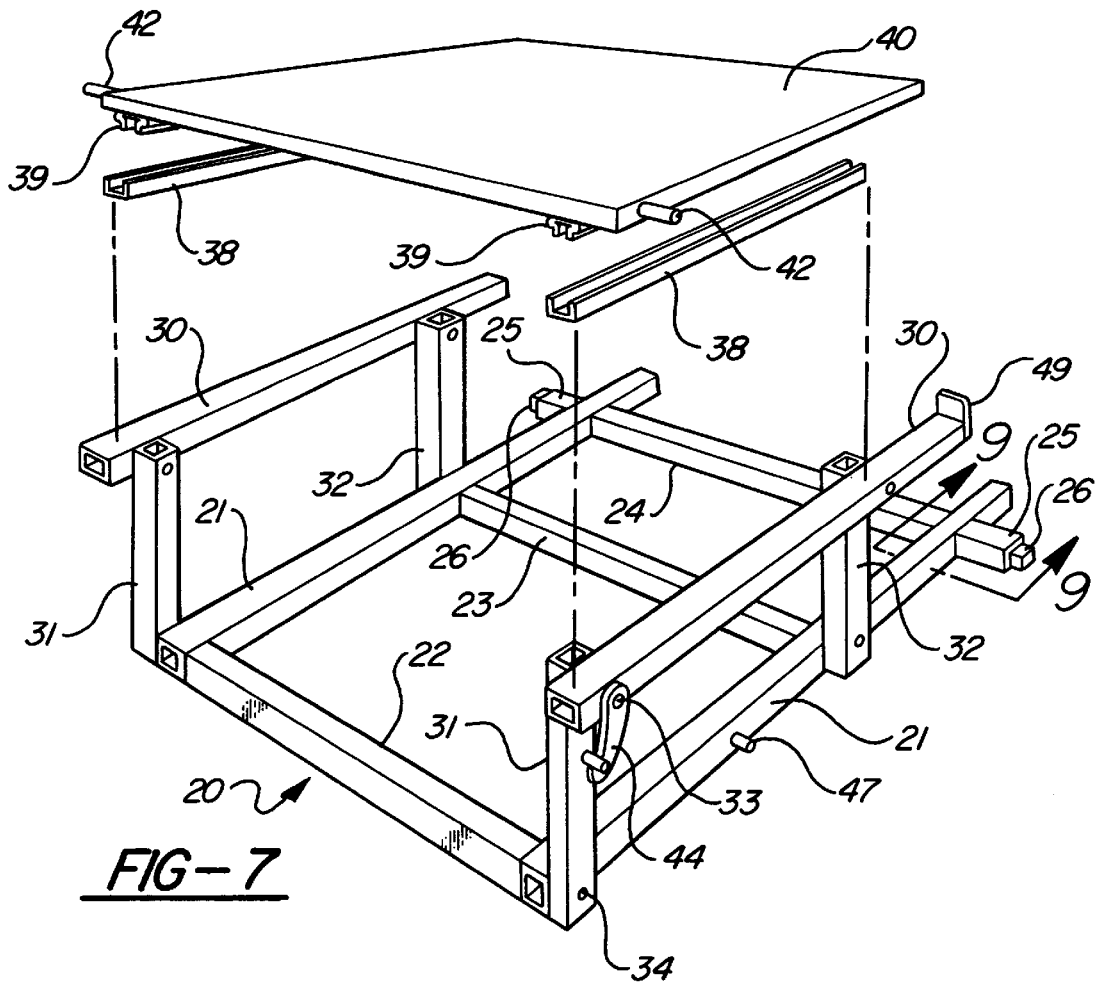
FIG. 7 is a disassembled, perspective view showing the table supporting framework in its upwardly extending position, and the table top shown above the framework, ready for assembly thereto, and the interconnecting track arrangement.
Figure 8:
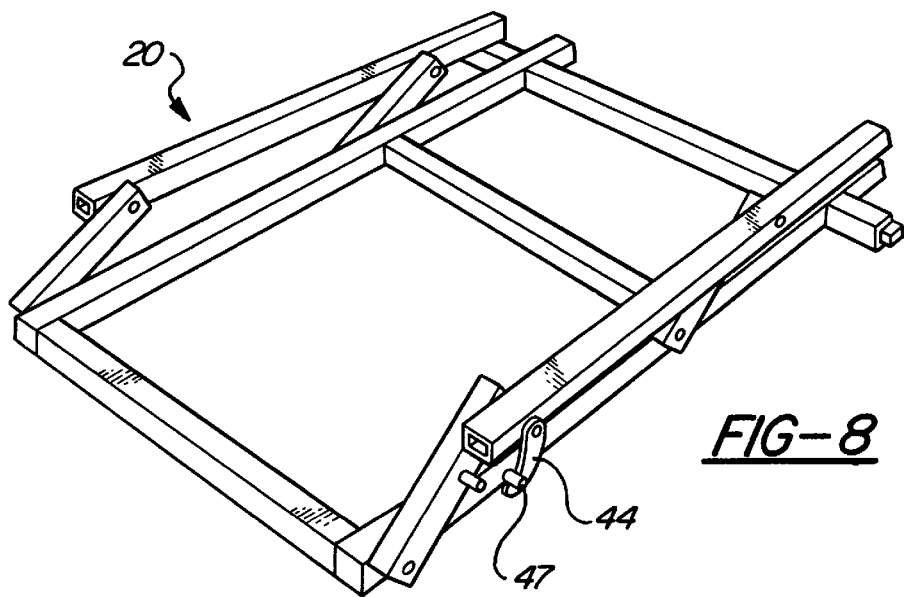
FIG. 8 is a perspective view of the framework that supports the table top shown in collapsed or folded position.

Channel shaped tracks 38 are secured upon the upper surfaces of the upper frame members 30. These tracks receive inverted channels 39 which form slide members or guides that are attached to the lower surface of the table top 40. (See FIG. 5). Thus, the table top 40 is slideably supported upon the upper tracks for slideable movement inwardly and outwardly of the vehicle trunk or body. To enable the user to easily move the table from its downward position, shown in FIG. 1, to its upward and then outward position shown in FIGS. 2 and 3, one or more handles 42 may be secured to the side edge of the table top (see FIG. 7) or to the upper frame members 30.

In order to hold the upper frame members in their raised position as indicated in FIGS. 2 and 3, a simplified lock or latch may be used. The particular latch selected may be any commercially available latch that temporarily holds the upper frame member in its upright positions relative to the legs and which also locks the upper frame members to the lower frame members when the table is lowered. An example of a suitable lock system is schematically illustrated in FIG. 10. It includes a hook 44 pivotally connected by a pivot pin 45 to an upper frame member 30. The hook engages a stud 46 extending sideways from the rear leg 31 when the table is raised. Similarly, the hook can be engaged with a stud 47 extending laterally from the lower frame member 21 when the table is collapsed to hold the table in collapsed position.

The table can be slid forwardly of the vehicle, so that it is completely within the trunk or rearwardly so that it is part-way outward of the trunk. In order to correctly position the table over the framework within the trunk, a stop plate 49 that engages the edge of the table top is provided on the forward end of the upper frame member 30 (see FIG. 6–7).

In operation, the entire framework, with the table top in position upon the upper frame members, can be manually lifted into the vehicle trunk or into the rear area of a sport utility vehicle or station wagon or a small truck or van and positioned upon the floor at the rear of the vehicle. At that point, the side-wise extending sliders 26 can frictionally engage the vehicle wall portions adjacent the cross-member 24 for securely holding the lower frame in position within the vehicle. At that point, the frame is collapsed and the table is stored in a horizontal position, as illustrated in FIG. 1. Because the table top is horizontal, various articles 50 (schematically indicated in dotted lines) may be placed upon the table top which forms a platform.

When it is desired to use the table, the trunk lid 14, or other closure at the rear of the vehicle, is opened. By grasping the handles 42 the user may swing the table upwardly into the position shown in FIG. 2. Then, the latch hook 44 may be moved into engagement with the stud 46 to lock the table in its upper position (see FIG. 2). At that point, the user may grasp the table top and pull it rearwardly out of the vehicle so that it extends part-way from the vehicle and is cantilevered from the upper frame members. With that arrangement, no legs are needed for holding the portion of the table that extends outwardly of the vehicle.

While the table top is manipulated into the upper position and then into the rearward extending position for use, the table remains horizontal. The movement of the table upwardly and outwardly of the vehicle is sufficiently smooth, due to the swinging action of the support legs, that any articles resting upon the table top can remain upon the table without being physically disturbed. Similarly, when it is desired to collapse and store the table again, the user may push the table top into the vehicle, release the latch hook 44 and swing the table, downwardly into the storage position shown in FIG. 1. At that point, the user may relatch the hook to the lower stud 47 to keep the table in its down position and avoid the rattling or moving or shifting of the table during motion of the vehicle. As mentioned, other conventional locking devices may be substituted for the hook latching device described above.

This invention may be further developed within the scope of the following claims. Accordingly, it is desired that the foregoing description be read as merely illustrative of an operative embodiment of this invention and not in a strictly limiting sense. Having fully described at least one operative embodiment of this invention, I now claim:

What is claimed is:

1. A foldable table for removable mounting within the rear opening trunk of an automobile and the like, comprising;
    a flat table top supported upon a folding frame adapted to rest upon the vehicle floor portion located within the trunk;
    said frame comprising a pair of coplaner elongated lower strips adapted to be positioned upon the vehicle trunk floor for extending along the length direction of the vehicle towards the rear opening of the trunk;
    fastener members removably holding said lower strips in said position;
    a pair of upper, elongated frame strips arranged horizontally and substantially parallel to said lower strips and being movable into a raised position above the lower strips and into a lowered position close to the lower strips;
    each upper strip having opposite end portions that are connected to one of the lower strips by a leg, with each leg having its opposite ends pivotally connected to the upper and lower strips respectively;
    a horizontally arranged, table top supported upon the upper strips the table top being manually movable together with the upper strips into a raised position for table use, spaced above the lower strips, and a lower position close to the lower strips for storage within the vehicle trunk;
    and slidable connectors securing the table top to the upper strips for enabling the table top, when it is in raised position, to be positioned above and parallel to said frame and to be manually slid in a vehicle rearward direction wherein a portion of the table top extends rearwardly outside of the vehicle or in a vehicle forward direction wherein the table top is entirely within the trunk, while the frame remains stationary within the trunk.

2. A foldable table top as defined in claim 1, and including said legs being of substantially equal length so that while the legs are pivoted into vertical positions and the upper strips, and the table top, are raised upwardly, the table top maintains a horizontal position from its normal storage position adjacent the lower frame members to its raised and outwardly extending position, so that articles may be rested upon the table top during storage of the table top within the vehicle trunk and during movement into and during use positions and return to its storage position.

3. A folding table top as defined in claim 2, and said connectors comprising tracks and cooperating followers slidably arranged within the tracks secured to said upper strips and the table top for slidably connecting and holding the table top upon the upper strips at all times while permitting the table top to be manually slid into and partially outwardly of the trunk.

4. A folding table top as defined in claim 3, and including a fastener attached upon the lower strips and extending laterally of the lower strips for releasably engaging and locking the lower strips against adjacent portions of the vehicle to enable temporarily positioning and immovably holding the frame lower strips within the vehicle trunk.

5. A folding table top as defined in claim 3, and said fastener comprising a fastener member extending transversely of, and secured to, the lower strips and having an end portion movable endwise of the cross-bar for releasably pressing against a vehicle wall portion for immovably locking the lower frame strips in their positions within the vehicle trunk.

6. A folded table as defined in claim 5, and including a manually operable lock attached to the frame for locking the upper strips in their raised position for use of the table or alternatively for locking the upper strips in their lowered position for storage of the table.

7. A folding table for mounting within the rear area of an automotive vehicle, such as within the trunk of an automobile, comprising;
    a table support frame having horizontal lower frame members adapted to be positioned upon a floor surface located within the rear portion of a vehicle, and horizontal upper frame members arranged above the lower support members, with the upper and lower frame members being interconnected by leg members;
    said lower frame members being formed of a pair of spaced apart, generally parallel, elongated strips;
    and said upper frame members being formed of a pair of spaced apart, generally parallel, elongated strips, each located adjacent, and parallel to, a lower frame member;
    said leg members being formed of elongated strips, each pivotally connected at one of its ends to a lower frame member and at its opposite end to an adjacent upper frame member, whereby the leg members may be pivoted into an approximately vertical position or, alternatively, into a nearly horizontal position so that the upper frame members may be raised upwardly a distance above their respective lower frame members with the respective leg members pivoted into substantially vertical positions and may be lowered to about the horizontal level of the lower frame members, with the leg members pivoted into substantially horizontal positions;
    a horizontally arranged table top supported upon the upper frame members, with connectors securing the table top to the upper frame members;
    said connectors including slideably interengaged connector parts fastened on the upper frame members and on the table top and cooperating so that the table top is horizontally slidable relative to the upper frame members when the upper frame members are raised above the lower frame members wherein the table top partially overlaps the upper frame members and partially extends outwardly of the upper frame members for thereby extending partially outwardly of the vehicle rear area upon which the frame is located;
    whereby the table top may be normally stored in a horizontal position, closely above the lower frame members, within the rear area of a vehicle, with the upper frame members and the leg members generally horizontally disposed adjacent the lower frame members, so that articles may be supported upon the table top and the table top may be raised, while maintaining its horizontal position and still supporting said articles thereon, by lifting it upwardly to thereby pivot the leg members into vertical positions wherein said table top is positioned above and parallel to said frame and then the table top may be slid partially outside of the vehicle rear area, such as part-way out of a vehicle trunk, for use as a picnic table or the like and then, the table top may be manually slid horizontally back upon the upper frame members completely over said rear area of the vehicle and thereafter, manually lowered towards the lower frame members.

8. A foldable table as defined in claim 7, and including said connector members comprising an elongated channel and tongue members slidably fitted within said channels, with the tongue members and channels secured upon adjacent portions of the table and upper frame members respectively, for sliding the table end-wise along the upper frame members.

9. A foldable table as defined in claim 7, and including cross-members interconnecting the lower frame members for forming a substantially rigid lower frame portion with the elongated lower frame members.

10. A foldable table as defined in claim 9, and including laterally extending frame portions arranged to engage against adjacent portions of the walls defining the vehicle rear area for securing the frame inmovably, but temporarily, within the vehicle rear area.

11. A foldable table as defined in claim 10, and including a locking device cooperating with the frame and table top for temporarily, releasably locking the table top and frame in either the raised position or the lower position, as desired.

* * * * *